(12) United States Patent
Younger (10) Patent No.: US 6,699,157 B2
(45) Date of Patent: Mar. 2, 2004

(54) METHODS AND SYSTEMS FOR IMPROVING THE OPERATION OF TRANSMISSIONS FOR MOTOR VEHICLES

(76) Inventor: Gilbert W. Younger, 2621 Merced Ave., El Monte, CA (US) 91733

( * ) Notice: Subject to any disclaimer, the term of this patent is extended or adjusted under 35 U.S.C. 154(b) by 0 days.

(21) Appl. No.: 10/105,674

(22) Filed: Mar. 25, 2002

(65) Prior Publication Data

US 2003/0181277 A1 Sep. 25, 2003

(51) Int. Cl.[7] .......................... F16H 31/00; F16H 61/26
(52) U.S. Cl. ...................................... 477/158; 475/127
(58) Field of Search ........................ 477/158; 475/127

(56) References Cited

U.S. PATENT DOCUMENTS

| | | | |
|---|---|---|---|
| 4,139,015 A | * 2/1979 | Sakai | 137/115 |
| 5,323,668 A | * 6/1994 | Nakagawa et al. | 477/163 |
| 5,505,675 A | * 4/1996 | Kuriyama et al. | 477/156 |
| 6,117,047 A | 9/2000 | Younger | |
| 6,485,388 B2 | * 11/2002 | Kim et al. | 475/127 |

* cited by examiner

Primary Examiner—Dirk Wright
(74) Attorney, Agent, or Firm—Mark P. Stone (57) ABSTRACT

The present invention is directed to methods and systems for improving the operation of transmissions for automotive vehicles, and in particular, the "factory installed" automotive transmissions installed by an original automobile manufacturer. The methods and systems modify both the structural components and hydraulic circuitry of the original automotive transmissions to adjust applied pressure and shifting patterns to enhance the operation of the modified transmissions.

24 Claims, 8 Drawing Sheets

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of transmissions for automotive vehicles, more commonly referred to as "factory installed" transmissions, installed in an automotive vehicle by an original motor vehicle manufacturer. The invention is more particularly directed to improvements to the "factory installed" transmission identified as CD-4E installed in vehicles manufactured by The Ford Motor Company of Dearborn, Mich.

The present inventor owns the following United States patents, each of which are expressly incorporated by reference into the present disclosure: U.S. Pat. No. 4,449,426, issued May 26, 1984; U.S. Pat. No. 4,711,140, issued Dec. 8, 1987; U.S. Pat. No. 4,790,938, issued Dec. 13, 1988; U.S. Pat. No. 5,253,549, issued Oct. 19, 1993; U.S. Pat. No. 5,540,628, issued Jul. 30, 1996; U.S. Pat. No. 5,624,342, issued Apr. 29, 1997; U.S. Pat. No. 5,730,685, issued Mar. 24, 1998; U.S. Pat. No. 5,743,823, issued Apr. 28, 1998; U.S. Pat. No. 5,768,953 issued Jun. 23, 1998; U.S. Pat. No. 5,820,507, issued Oct. 7, 1998; U.S. Pat. No. 5,967,928, issued Oct. 19, 1999; U.S. Pat. No. 6,099,429, issued Aug. 8, 2000; U.S. Pat. No. 6,117,047, issued Sep. 12, 2000; and U.S. Pat. No. 6,287,231, issued Sep. 11, 2001.

A publication entitled CD4E Automatic Transaxle Theory/Operation Reference Manual, Copyright 1993, published by The Ford Motor Company, discloses the "factory installed" CD-4E automotive transmission. This publication is expressly incorporated by reference, in its entirety, into the present disclosure.

U.S. Pat. No. 6,117,047, which is also expressly incorporated by reference into the present disclosure, is directed to, among other things, methods and systems for improving the operation of the "factory installed" CD-4E automotive transmission. In accordance with the disclosure of U.S. Pat. No. 6,117,047, a "factory installed" CD-4E automotive transmission is modified to improve its performance by adjusting the diameter of transmission fluid lines at predetermined locations within the hydraulic circuitry for adjusting the pressure within said hydraulic circuitry. Additionally, the end plug of the "factory installed" main regulator valve is replaced by a new relief valve assembly to further regulate and control the fluid pressure of the "factory installed" automotive transmission.

It is the primary object of the present invention to provide additional modifications to the "factory installed" CD-4E automotive transmission to enhance the operation and performance of the transmission.

Other objects and advantages of the present invention will become apparent from the following discussion of the invention in conjunction with the drawings.

SUMMARY OF THE INVENTION

In a first aspect of the present invention, a portion of TV (throttle valve) fluid passageway coupled to the bore in which the main regulator valve of the "factory installed" CD-4E automotive transmission is housed, is modified to provide an exhaust between the TV passageway and an LPX (line pressure exhaust) fluid flow passageway also coupled to the bore for the main regulator valve. The exhaust is positioned between a port in the valve bore for the TV passageway, and a port in the valve bore for the LPX passageway. The exhaust removes any LPX fluid in the bore before it reaches the TV port to prevent LPX fluid from entering the TV port or otherwise mixing with TV fluid. By separating the LPX fluid from the TV fluid, the LPX fluid is prevented from adversely affecting the controlled pressure applied to the main regulator valve by the TV fluid which would adversely affect the operation and performance of the main regulator valve.

In a further aspect of the present invention, a reinforcing sleeve is inserted in a portion of the bore of the main regulator valve which is subject to wear and erosion as the valve ages. The wear/erosion of the inner surface of the valve bore, particularly near the TV port, permits LPX fluid to flow around the lands of the valve and into regions in the bore proximate to the TV port. The reinforcement sleeve seals the bore to prevent flow of LPX into the region of the bore proximate to the TV port, thereby providing an isolation barrier between TV and LPX fluid in the valve bore.

In accordance with the present invention, the structure and hydraulic circuitry of the factory installed CD-4E transmission are modified to prevent LPX fluid from mixing with TV fluid in the main regulator valve bore, which would adversely affect the pressure applied to the main regulator valve by the TV fluid thereby adversely affecting the operation of the factory installed transmission.

DESCRIPTION OF THE BEST MODES FOR CARRYING OUT THE INVENTION

FIG. 1 illustrates the hydraulic circuity of a "factory installed" CD-4E automotive transmission. A main regulator valve, generally designated by reference numeral 2, moves reciprocally within a valve bore generally designated by reference numeral 4. A fluid flow passageway for TV (throttle valve) oil, designated by reference numeral 6, is coupled to the valve bore 4. A LP (line pressure) fluid flow passageway, generally designated by reference numeral 8, and an LPX (line pressure exhaust) fluid flow passaageway, generally designated by reference numeral 10, are also coupled to the valve bore 4.

Figure 1A:
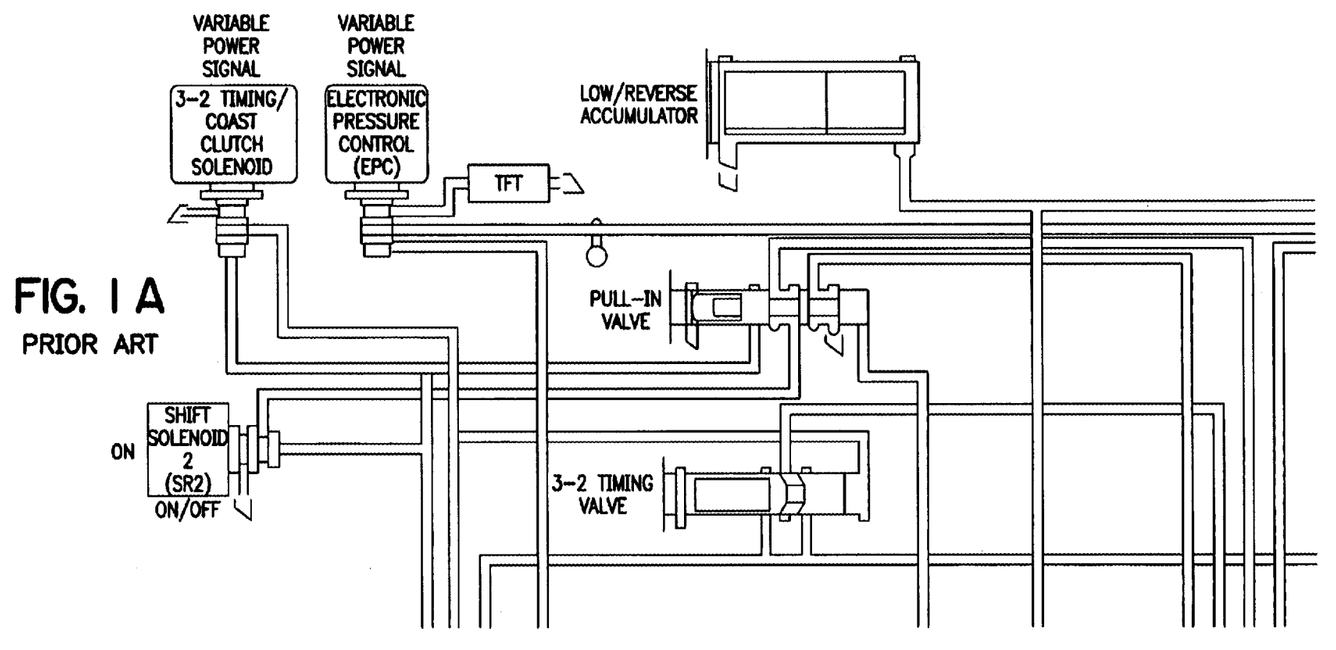
FIG. 1 illustrates a the hydraulic circuitry of a "factory installed" CD-4E automotive transmission showing the main regulator valve in relation to other components of the hydraulic circuitry.
Figure 1B:
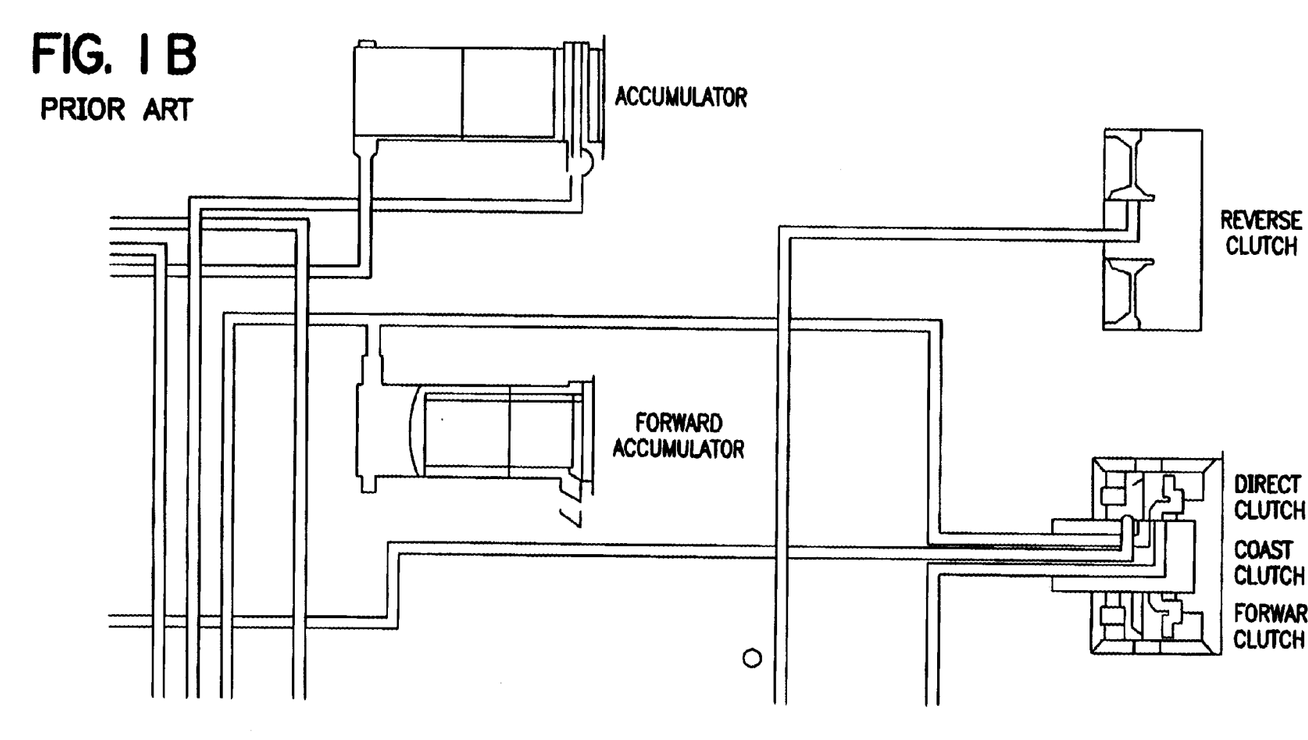
Figure 1C:
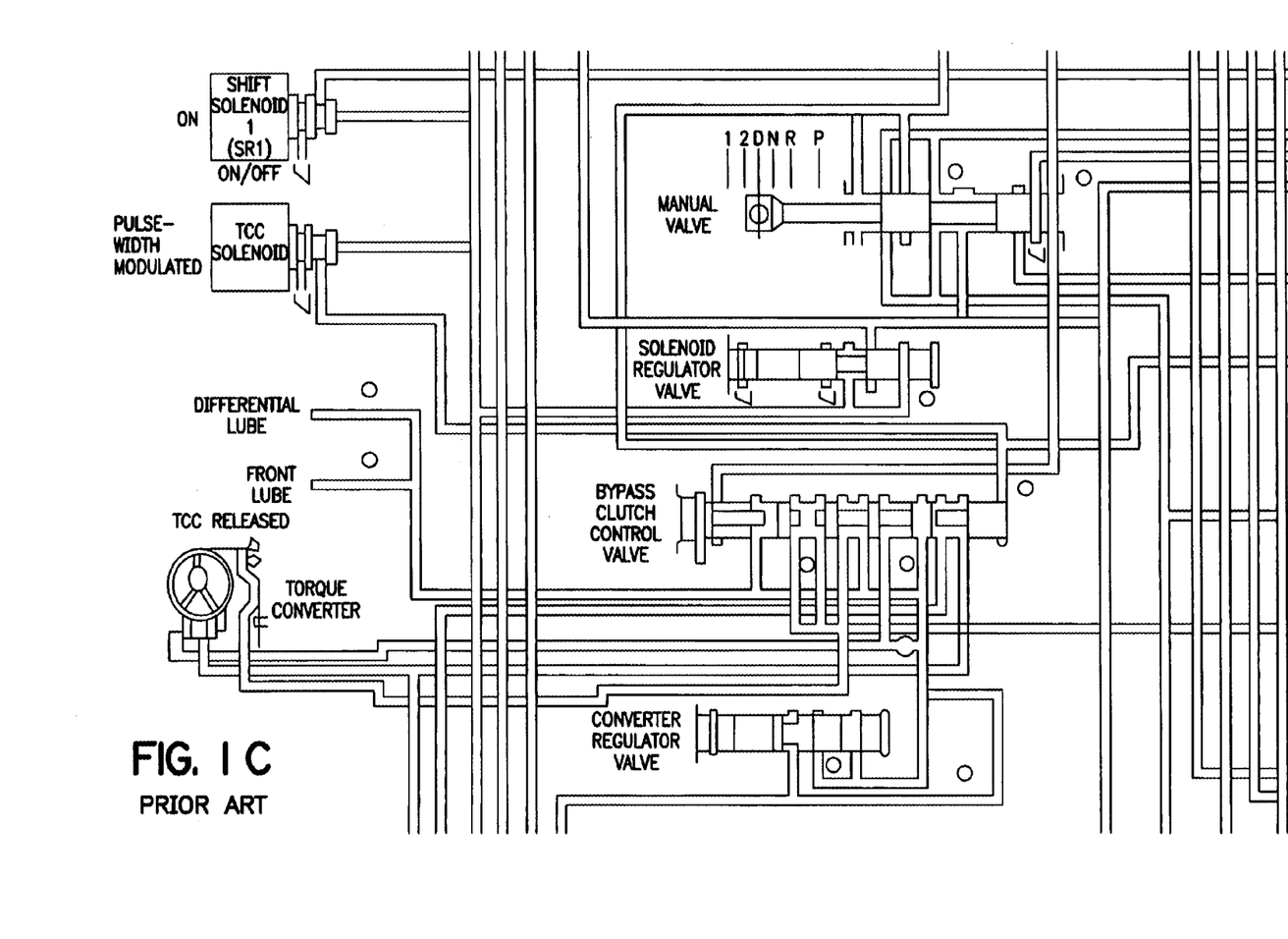
Figure 1D:
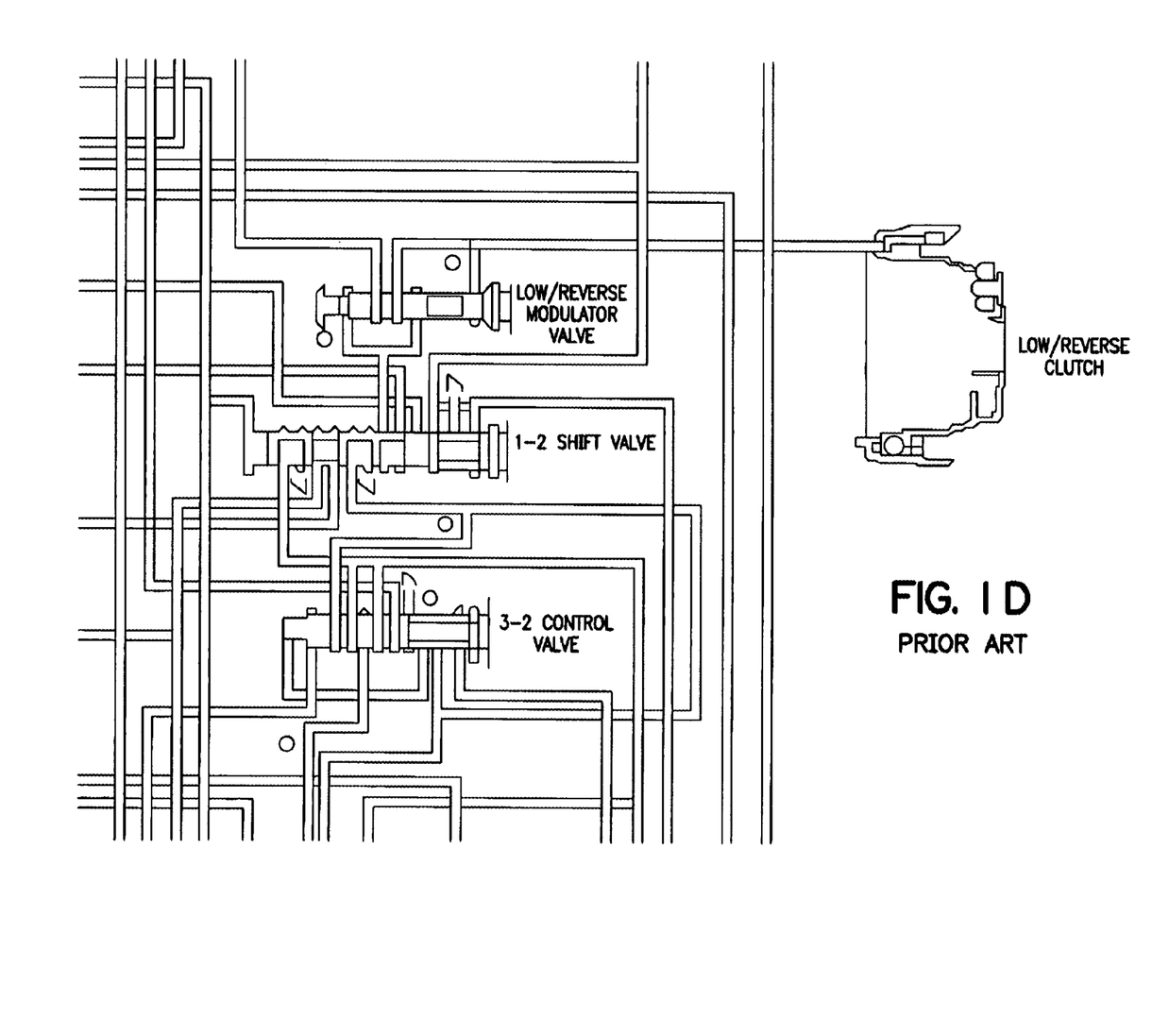
Figure 1E:
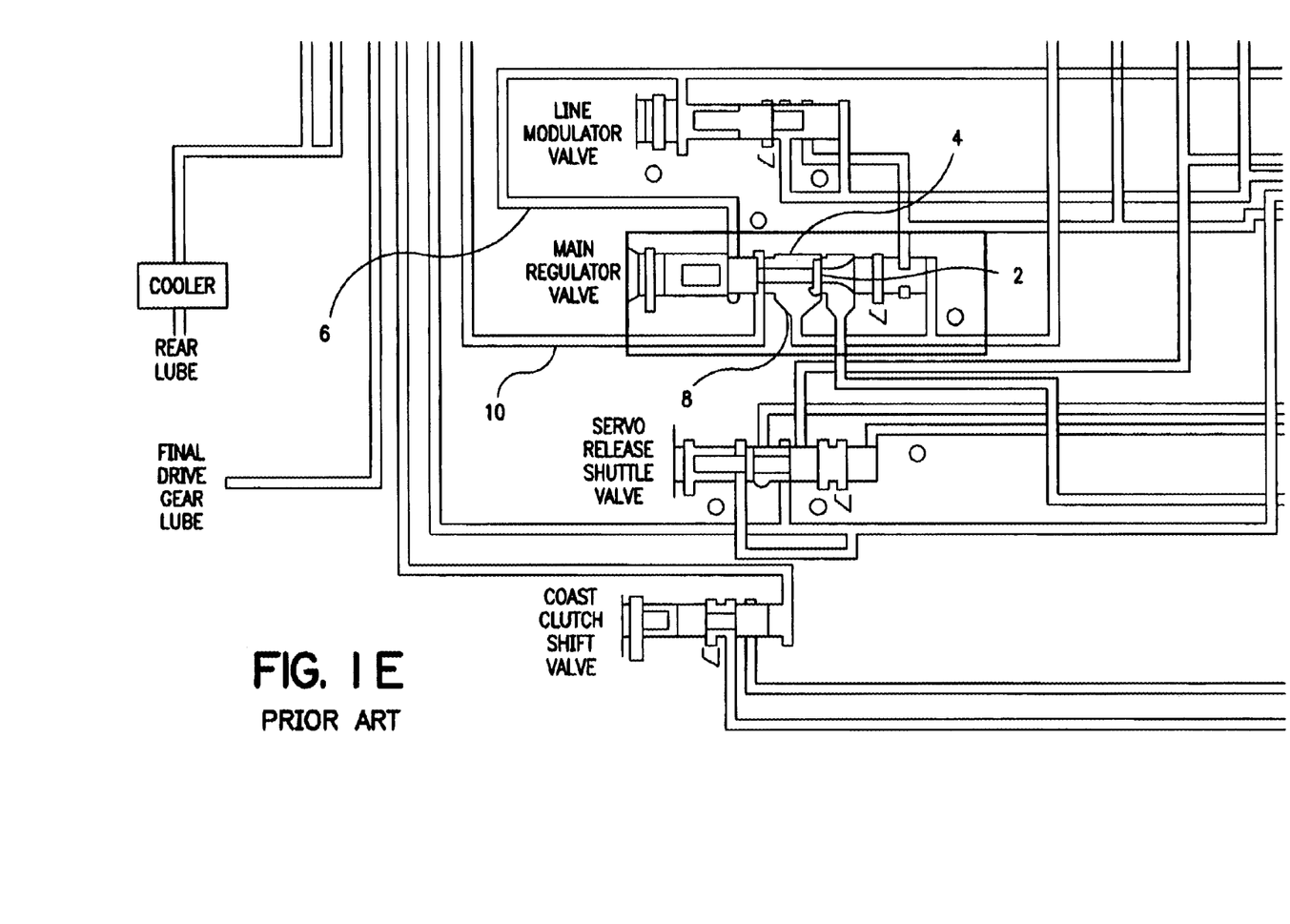
Figure 1F:
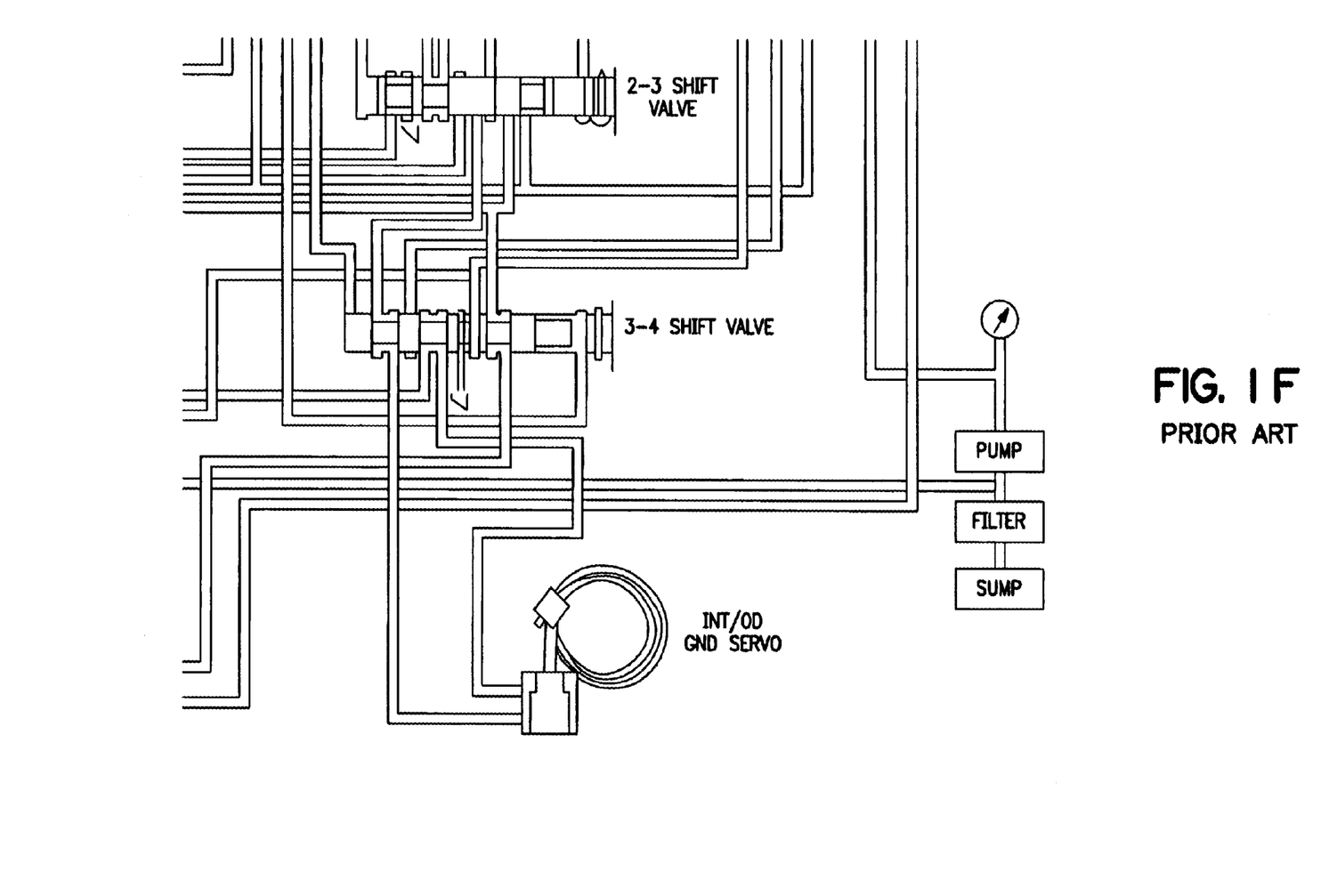
Figure 2:
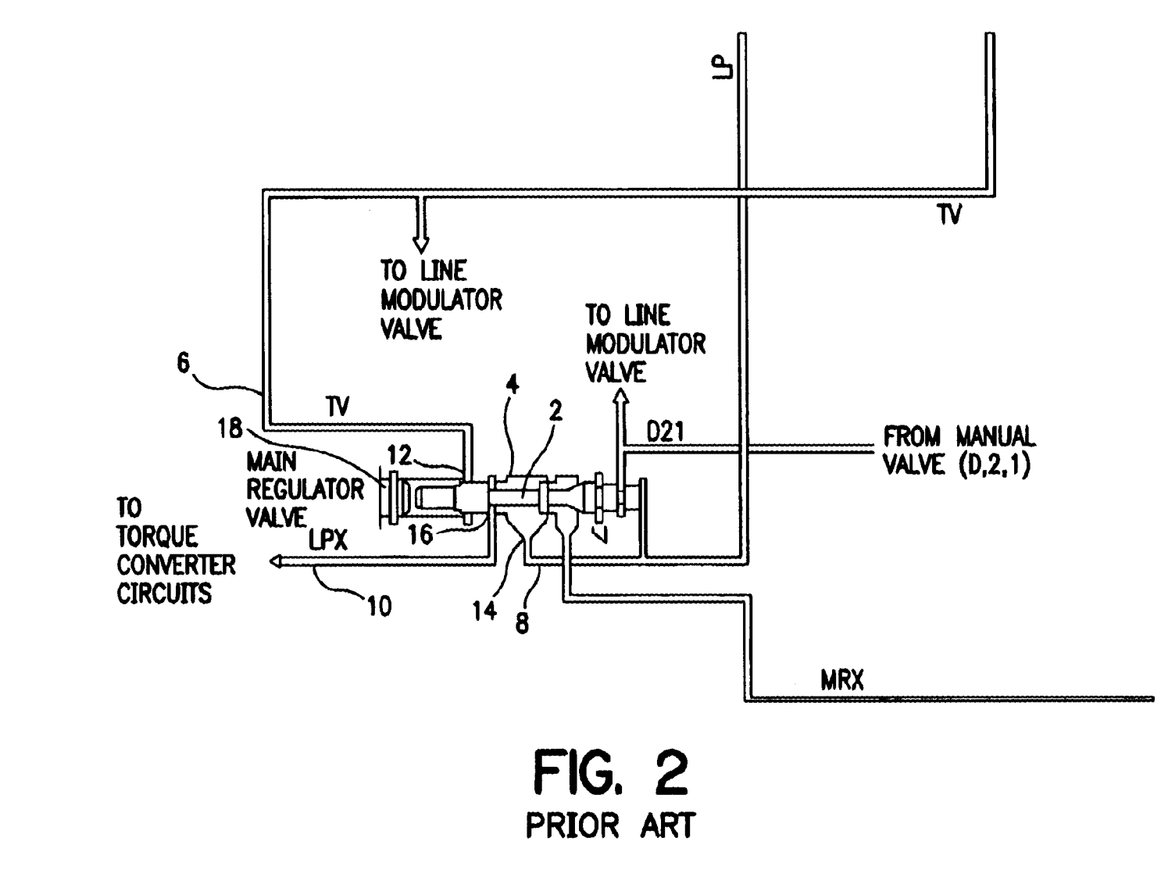
FIG. 2 illustrates the main regulator valve and fluid flow passageways coupled to the valve bore in the "factory installed" CD-4E automotive transmission.

As best seen in FIG. 2, the TV fluid passageway 6 is coupled to the valve bore 4 by a port 12 defined in the bore; the LP fluid passageway 8 is coupled to the valve bore by a port 14 defined in the bore; and the LPX fluid passageway 10 is coupled to the valve bore by a port 16 defined in the bore.

During normal operation of the main regulator valve, pressure from LP oil is applied to the valve 2 through passageway 8, urging the valve in a leftward direction as seen in FIG. 2. As the valve 2 moves in a leftward direction, port 16, which is initially blocked by lands of the valve, is uncovered, thereby permitting LP fluid to enter passageway 10, and thereby decreasing the pressure applied to the valve by the LP oil. The reduction in the pressure applied to the valve by the LP fluid, in cooperation with the resilient force of a spring (not shown in FIG. 2) urging the valve in a rightward direction as shown in FIG. 2, causes the valve to move rightwardly. As the valve moves into its rightward position, the land of the valve again covers port 16, preventing the flow of LP fluid through passageway 10, thereby increasing the LP pressure applied to the right side of the valve 2. The valve then moves in a leftward direction, to repeat the operating sequence described above, to permit the valve to continue its reciprocal motion in the bore.

The reciprocating movement of the valve 2 in the bore 4 is controlled by the application of fluid pressure applied through TV passageway 6. By increasing the pressure applied to the left end of the valve 2, the valve is moved in a rightward direction in the bore, while decreasing the TV pressure applied to the left end of the valve 2 tends to move the valve in a leftward direction in the bore. Therefore, adjusting the TV pressure applied to the valve 2 through passageway 6 controls the position and movement of the valve 2 in the bore, thereby controlling the flow of LP and LPX fluid. The LPX fluid flowing from the main regulator valve is, itself, applied to the torque converter circuits of the automotive transmission.

The application of TV fluid to the valve 2 through passageway 6 is, itself, computer controlled. The TV fluid pressure applied to the left side of the valve is increased during high engine torque, and is decreased during low engine torque.

As a result of the reciprocal movement of the valve 2 in the bore 4, the inner surfaces of the bore tend to wear or erode over the course of time. Wearing or erosion of the bore permits fluid from the LPX passageway 10 to flow between the outer surfaces of the lands of the valve and the worn portions of the inner surface of the bore, into the region of the bore proximate to the port 12 for the TV passageway 6. Thus, wear/erosion of the bore breaks the seal/isolation barrier provided by the valve between the TV passageway port 12 and the LPX passageway port 16, permitting LPX fluid to mix with TV fluid in regions of the bore towards the left end of the valve proximate to the TV passageway port 12. Entry of LPX fluid into this region of the bore results in uncontrolled fluid pressure applied to the left end of the valve, thereby adversely affecting the application of TV pressure which adversely affects the control exercised by the TV fluid pressure on the movement and operation of the valve 2 within the bore 4.

Figure 3:
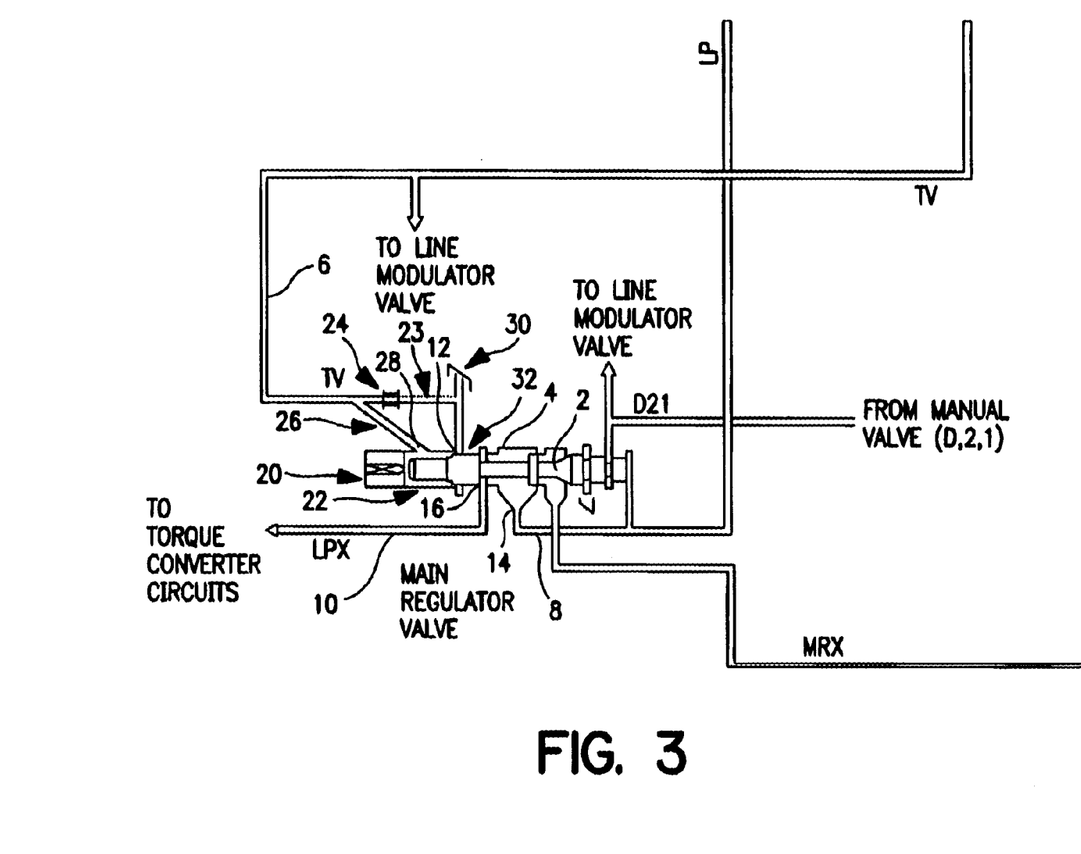
FIG. 3 illustrates modifications to the main regulator valve and fluid flow passageways coupled thereto, in accordance with the present invention.

FIG. 3 illustrates the main regulator valve and hydraulic circuitry shown in FIG. 2, modified in accordance with the present invention. A left end cap 18 (FIG. 2) for the valve bore 4 is replaced by a TV relief valve assembly designated by reference numeral 20 in FIG. 3. Although this modification to the "factory installed" CD-4E automotive transmission does not by itself form part of the present invention (it is more fully disclosed and illustrated in prior U.S. Pat. No. 6,117,047), the use of the pressure relief valve assembly as disclosed in U.S. Pat. No. 6,117,047, in combination with the improvements of the present invention, further enhances the improvements to the overall operation of the modified automotive transmission.

Still referring to FIG. 3, a sleeve, designated by reference numeral 22, which in the preferred embodiment of the invention is mounted over the outer surface of at least a portion of the valve bore 4, is provided to reinforce the left section of the valve bore 4, proximate to the port 12 coupling the TV passageway 6 to the bore. The sleeve 22 tends to reinforce the structural integrity of the bore, and to maintain the seal/isolation barrier provided by the valve 2 in the bore 4 for preventing flow of LPX fluid into the left region of the bore even after the inner surface of the "factory installed" bore has been worn or eroded.

Still referring to FIG. 3, a portion of the existing TV passageway 6 (generally designated by reference numeral 23) coupled to the bore 4 through port 12 as shown by FIG. 2, is blocked by a plug 24 inserted into the original passageway 6 at a position near the valve bore 4, as shown by FIG. 3. A new passageway 26 is provided to couple the unblocked portion of the existing TV passageway 6 at a position proximate to the plug 24, to a new port 28 defined in the bore 4. The new passageway section 26 bypasses the plugged section 23 of the TV passageway of the "factory installed" transmission, and applies TV fluid to the left end of the valve 2 through the new port 28 defined in the bore 4.

An exhaust 30 is provided in the plugged portion 23 of the original TV passageway 6 of the "factory installed" transmission. The exhaust 30 is in fluid communication with the original port 12 defined in the valve bore 4 for the original TV passageway 6. As a result of the cooperation between the exhaust 30 and the port 12, any LPX fluid which has flowed into the left section of the bore (as for example from wear or erosion of the inner surface of the bore at the location designated as reference numeral 32), is exhausted from the bore through the port 12 and the portion 23 of the original TV passageway 6 coupled to the exhaust 30, to remove LPX fluid from the valve bore 4 before it flows into the region proximate to the new port 28 coupling the new passageway section 26 of the TV passageway 6 to the bore 4.

As a result of the modification to the hydraulic circuitry in accordance with the present invention, the application of TV fluid to the left side of the main regulator valve 2 precisely controls the movement and operation of the valve, unimpeded by unregulated pressure of LPX fluid which is exhausted from the valve bore. The hydraulic circuitry of the "factory installed" transmission is modified to use a portion of the existing factory installed TV passageway coupled to the valve bore to provide an exhaust between the TV hydraulic circuit and the LPX hydraulic circuit. Another portion of the original TV passageway is modified to permit the TV fluid to bypass the exhaust and flow directly into the valve bore.

Although the preferred embodiment of the invention discussed herein provides an exhaust between the throttle valve (TV) fluid hydraulic circuit and the line pressure exhaust (LPX) hydraulic circuit of the factory installed CD-4E automotive transmission, it is within the scope of the invention to provide exhausts between other hydraulic circuits as may be necessary. For example, modification to the factory installed CE-4E transmission to provide an exhaust between the throttle valve (TV) fluid passageway 6 and the line pressure (LP) fluid passageway 8 can be accomplished in the same manner in which the exhaust is provided between the throttle valve fluid passageway 6 and the line pressure exhaust passageway 10, as discussed herein.

Other features and advantages of the present invention will become apparent to those skilled in the relevant art. Accordingly, the description of the preferred embodiments of the invention herein is intended to be illustrative only, and not restrictive of the scope of the invention, that scope being defined by the following claims and all equivalents thereto.

What is claimed is:

1. A method for modifying hydraulic circuitry of an automotive transmission including a main regulator valve mounted in a valve bore for reciprocal movement therein; a fluid flow passageway for throttle valve (TV) fluid coupled in fluid communication to said valve bore at a first predetermined position on said valve bore; and a fluid flow passageway for line pressure exhaust (LPX) fluid coupled in fluid communication to said valve bore at a second predetermined position on said valve bore; said main regulator valve providing a barrier between said first and second predetermined positions on said valve bore for separating fluid from said passageway for throttle valve fluid and fluid from said passageway for line pressure exhaust fluid in said valve bore;

the steps of said method comprising:
providing an exhaust for said line pressure exhaust (LPX) fluid between said passageway for throttle valve fluid and said passageway for line pressure exhaust fluid.

2. The method as claimed in claim 1, wherein the step of providing said exhaust comprises the further step of:
blocking said passageway for throttle valve fluid at a predetermined location therein before said passageway for throttle valve fluid is coupled to said first predetermined position on said valve bore.

3. The method as claimed in claim 2, wherein the step of providing said exhaust comprises the further steps of:
defining an opening at a third predetermined position an said valve bore, and
providing a fluid flow passageway coupling said passageway for throttle valve fluid to said opening at said third predetermined position on said valve bore for permitting throttle valve fluid flow to bypass the blockage at said predetermined location in said passageway for throttle valve fluid.

4. The method as claimed in claim 3 wherein, the step of providing said exhaust comprises the further step of:
providing an exhaust opening in said passageway for throttle valve fluid between said predetermined location in said passageway for throttle valve fluid and said first predetermined position on said valve bore,
whereby said exhaust is disposed between a throttle valve (TV) circuit and a line pressure exhaust (LPX) circuit of said hydraulic circuitry.

5. The method as claimed in claim 1, the steps of said method comprising:
providing a reinforcing sleeve for said valve bore to compensate for wear and erosion to the inner surface of the valve bore for maintaining a barrier preventing fluid flow between said first and said second predetermined positions on said valve bore.

6. A method for modifying hydraulic circuitry of a CD-4E automotive transmission including a main regulator valve mounted in a valve bore for reciprocal movement therein; a fluid flow passageway for throttle valve (TV) fluid coupled in fluid communication to said valve bore at a first predetermined position on said valve bore; and a fluid flow passageway for line pressure exhaust (LPX) fluid coupled in fluid communication to said valve bore at a second predetermined position on said valve bore; said main regulator valve providing a barrier between said first and second predetermined positions on said valve bore for separating fluid from said passageway for throttle valve fluid and fluid from said passageway for line pressure exhaust fluid in said valve bore;

the steps of said method comprising:
providing an exhaust for said line pressure exhaust (LPX) fluid between said passageway for throttle valve fluid and said passageway for line pressure exhaust fluid.

7. The method as claimed in claim 6, wherein the step of providing said exhaust comprises the further step of:
blocking said passageway for throttle valve fluid at a predetermined location therein before said passageway for throttle valve fluid is coupled to said first predetermined position on said valve bore.

8. The method as claimed in claim 7, wherein the step of providing said exhaust comprises the further steps of:
defining an opening at a third predetermined position an said valve bore, and
providing a fluid flow passageway coupling said passageway for throttle valve fluid to said opening at said third predetermined position on said valve bore for permitting throttle valve fluid flow to bypass the blockage at said predetermined location in said passageway for throttle valve fluid.

9. The method as claimed in claim 8 wherein, the step of providing said exhaust comprises the further step of:
providing an exhaust opening in said passageway for throttle valve fluid between said predetermined location in said passageway for throttle valve fluid and said first predetermined position on said valve bore,
whereby said exhaust is disposed between a throttle valve (TV) circuit and a line pressure exhaust (LPX) circuit of said hydraulic circuitry.

10. The method as claimed in claim 6, the steps of said method comprising:
providing a reinforcing sleeve for said valve bore to compensate for wear and erosion to the inner surface of the valve bore for maintaining a barrier preventing fluid flow between said first and said second predetermined positions on said valve bore.

11. A method for modifying the hydraulic circuitry of an automotive transmission having a main regulator valve mounted in a valve bore for reciprocal movement therein, a throttle valve (TV) passageway coupled in fluid flow relationship to said valve bore at a first opening in said valve bore; and a line pressure exhaust (LPX) passageway coupled in fluid flow relationship to said valve bore at a second opening defined in said valve bore; said main regulator valve providing a barrier for separating fluid from said throttle valve passageway and fluid from said line pressure exhaust passageway in said valve bore; the steps of said method comprising:
providing a reinforcement sleeve for said valve bore for compensating for wear and erosion of said valve bore to prevent mixing of fluids from said throttle valve passageway and said line pressure exhaust passageway in said valve bore.

12. The method as claimed in claim 11, said method comprising the step of:
providing an exhaust between said line pressure exhaust passageway and said throttle valve passageway for preventing mixing of throttle valve fluid and line pressure exhaust fluid in said valve bore.

13. The method as claimed in claim 12, wherein the step of providing said exhaust comprises the step of:
blocking said throttle valve passageway at a predetermined position therein before said throttle valve passageway is coupled to said first opening in said valve bore.

14. The method as claimed in claim 13, wherein the step of providing said exhaust comprises the steps of:
   defining a third opening in said valve bore, and
   providing a fluid flow passageway coupling said throttle valve passageway before the blockage at said predetermined position therein to said third opening in said valve bore for permitting throttle valve fluid flow to bypass the blockage at said predetermined position in said throttle valve passageway.

15. The method as claimed in claim 14, wherein the step of providing said exhaust comprises the step of:
   providing an exhaust opening in said throttle valve passageway at a location between said predetermined position in said throttle valve passageway and said first opening in said valve bore,
   whereby said exhaust is disposed between a throttle valve (TV) circuit and a line pressure exhaust (LPX) circuit of said hydraulic circuitry.

16. A method for modifying the hydraulic circuitry of a CD-4E automotive transmission having a main regulator valve mounted in a valve bore for reciprocal movement therein, a throttle valve (TV) passageway coupled in fluid flow relationship to said valve bore at a first opening in said valve bore; and a line pressure exhaust (LPX) passageway coupled in fluid flow relationship to said valve bore at a second opening defined in said valve bore; said main regulator valve providing a barrier for separating fluid from said throttle valve passageway and fluid from said line pressure exhaust passageway in said valve bore; the steps of said method comprising:
   providing a reinforcement sleeve for said valve bore for compensating for wear and erosion of said valve bore to prevent mixing of fluids from said throttle valve passageway and said line pressure exhaust passageway in said valve bore.

17. The method as claimed in claim 16, said method comprising the step of:
   providing an exhaust between said line pressure exhaust passageway and said throttle valve passageway for preventing mixing of throttle valve fluid and line pressure exhaust fluid in said valve bore.

18. The method as claimed in claim 17, wherein the step of providing said exhaust comprises the step of:
   blocking said throttle valve passageway at a predetermined position therein before said throttle valve passageway is coupled to said first opening in said valve bore.

19. The method as claimed in claim 18, wherein the step of providing said exhaust comprises the steps of:
   defining a third opening in said valve bore, and
   providing a fluid flow passageway coupling said throttle valve passageway before the blockage at said predetermined position therein to said third opening in said valve bore for permitting throttle valve fluid flow to bypass the blockage at said predetermined position in said throttle valve passageway.

20. The method as claimed in claim 19, wherein the step of providing said exhaust comprises the step of:
   providing an exhaust opening in said throttle valve passageway at a location between said predetermined position in said throttle valve passageway and said first opening in said valve bore,
   whereby said exhaust is disposed between a throttle valve (TV) circuit and a line pressure exhaust (LPX) circuit of said hydraulic circuitry.

21. A method for modifying the hydraulic circuitry of an automotive transmission having a main regulator valve mounted in a valve bore for reciprocal movement therein, a first fluid flow passageway coupled in fluid flow relationship to said valve bore at a first opening in said valve bore for supplying fluid to urge said valve to move in a first direction in said valve bore; and a second fluid flow passageway coupled in fluid flow relationship to said valve bore at a second opening defined in said valve bore for supplying fluid to urge said valve to move in a second direction in said valve bore; said main regulator valve providing a barrier for separating fluid from said first fluid flow passageway and fluid from said second fluid flow passageway in said valve bore; the steps of said method comprising:
   providing an exhaust between said first fluid flow passageway and said second fluid flow passageway.

22. The method as claimed in claim 21, wherein the step of providing said exhaust comprises the step of:
   blocking said first fluid flow passageway at a predetermined position therein before said first fluid flow passageway is coupled to said first opening in said valve bore.

23. The method as claimed in claim 22, wherein the step of providing said exhaust comprises the steps of:
   defining a third opening in said valve bore, and
   providing a third fluid flow passageway coupling said first fluid flow passageway before the blockage at said predetermined position therein to said third opening in said valve bore for permitting fluid from said first fluid flow passageway to bypass the blockage at said predetermined position in said first fluid flow passageway.

24. The method as claimed in claim 23, wherein the step of providing said exhaust comprises the step of:
   providing an exhaust opening in said first fluid flow passageway at a location between said predetermined position in said first fluid flow passageway and said first opening in said valve bore.

* * * * *